Figure 1:
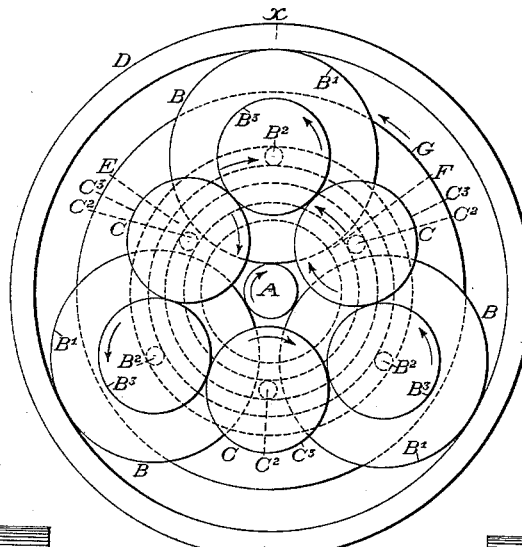

(No Model.)

R. W. HENT.
ROLLER BEARING.

No. 399,615. Patented Mar. 12, 1889.

Witnesses:
James Claig
John C. Minard

Inventor:
Reuben W. Hent

United States Patent Office.

REUBEN W. HENT, OF SAN FRANCISCO, CALIFORNIA.

ROLLER-BEARING.

SPECIFICATION forming part of Letters Patent No. 399,615, dated March 12, 1889.

Application filed April 13, 1888. Serial No. 270,567. (No model.)

*To all whom it may concern:*

Be it known that I, REUBEN W. HENT, a citizen of the United States, residing in the city and county of San Francisco and State of California, have invented a certain new and useful Improvement in Roller-Bearings, of which the following is a specification.

My invention is an improvement on my roller-bearing shown and described in my application for patent filed March 23, 1888, Serial No. 268,234, in which a ring bears at its periphery on journals of a series of bearing-rollers bearing directly on and projecting beyond sleeves upon the shaft and sleeves within the casing, and at its inner side on journals of a series of separating-rollers bearing on none of said sleeves, but on the projections of the bearing-rollers, keeping the latter separate from each other, and a smaller (or inner) ring bears at its periphery on journals of the separating-rollers, and a larger (or outer) ring bears at its inner side on journals of the bearing-rollers. In said roller-bearing, if the proportions necessary to avoid sliding friction are observed, the weakest parts, as well as the parts having the greatest speed of axial rotation, are the journals of the separating-rollers rotating in contact with the inner side of the intermediate ring, while the journals of the bearing-rollers, rotating in contact with its periphery, are unnecessarily strong.

The object of my improvement is to provide a construction in which, consistently with said proportions, said journals of the separating-rollers may be made much larger, (stronger,) and said journals of the bearing-rollers, with due regard to their strength, much smaller than in said roller-bearing, and the speed of the axial rotations of the separating-rollers and of the rings caused by the axial rotations of said journals may be greatly reduced, thereby rendering said journals of the separating-rollers and the rings less liable to wear. This object is attained by providing the bearing-rollers with journals smaller than these rollers and bearing only on the separating-rollers, and so constructing the latter rollers that they bear on these smaller journals and on no other parts of the bearing-rollers, thereby permitting the separating-rollers to be made larger, their said journals to be proportionately enlarged and their said speed to be reduced. In such smaller journals, bearing only on the separating-rollers, in such separating-rollers, bearing on no parts of the bearing-rollers other than said journals, and in the peculiar construction and combinations of the parts hereinafter set forth, consist, essentially, my improvement.

It is illustrated in the accompanying drawings, in which—

Figure 3:
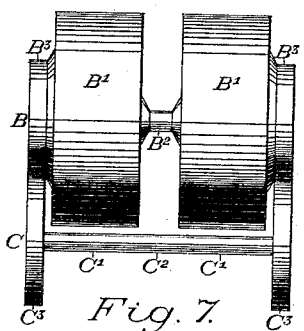
Figure 4:
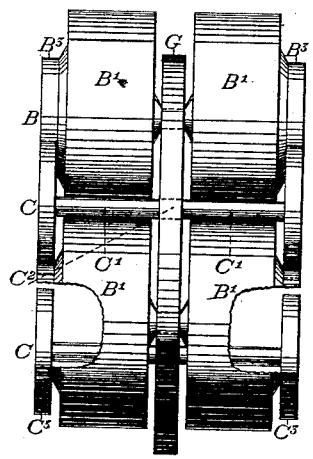
Figure 2:
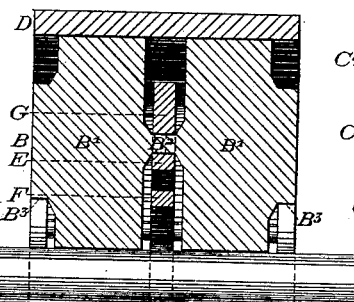
Figure 7:
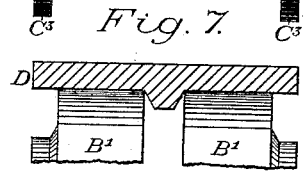

Figure 1 is an end view of a roller-bearing embodying my improvement. Fig. 2 is a longitudinal section through the center, or on the line $x\ x$, Fig. 1. Fig. 3 is a side view of a bearing-roller and a separating-roller, showing the relative positions of the rollers, as seen along the plane tangent to both. Fig. 4 is a side view of my improved roller-bearing as it appears after the removal of the shaft and casing, portions of a bearing-roller being broken away. Figs. 5, 6, 7, 8, and 9 are views showing means of retaining the several parts in their proper longitudinal positions.

A represents the shaft (or central journal;) B, the bearing-rollers as wholes; C, the separating-rollers as wholes; D, the bearing-casing, and E, F, and G the rings.

The rings are hollow cylinders, coaxial with the shaft and with each other, and of different diameters, F representing the smaller (or inner,) G the larger (or outer,) and E the intermediate ring.

Each bearing-roller B consists of two journals, B′, bearing directly on the central journal, A, and the casing D of a small journal, $B^2$, located between the journals B′ and rotating in contact with the periphery of the ring E and the inner side of the ring G, and of two journals, $B^3$, of smaller diameter than the journals B′, and located one at the outer end of each journal B′.

The separating-rollers C, keeping the rollers B separate from each other, consist each of two journals, $C^3$, and of a small journal, $C^2$, located between the journals $C^3$, and rotating in contact with the inner side of the ring E and the periphery of the ring F. Those portions C′ of the journals $C^3$ which are directly between the journals B′ are reduced in diameter so as not to touch the latter journals.

The journals $B^3$ bear only on the journals $C^3$, each journal $B^3$ on and between two journals, $C^3$, and form the only bearings of the rollers B on the rollers C. The journals $C^3$ bear only on the journals $B^3$, each journal $C^3$ on and between two journals, $B^3$, and form the only bearings of the rollers C on the rollers B.

The intermediate ring, E, is interposed between and bears on the journals $B^2$ at its periphery and the journals $C^2$ at its inner side. The smaller (or inner) ring, F, bears at its periphery on the journals $C^2$, and the larger (or outer) ring, G, bears at its inner side on the journals $B^2$.

The arrow-heads indicate the relative directions, when the casing is stationary, of the axial rotations of the shaft and rollers and of the rings caused by the axial rotations of the journals $B^2$ and $C^2$.

The diameter of the journals $C^3$ must be such that they do not touch the shaft or casing, and may be, according to the diameter of the journals $B^3$, smaller than, equal to, or even greater than the diameter of the journals $B^3$. Therefore, by means of said journals $B^3$, the anti-friction proportions may be observed, and the diameter of the journals $C^2$ be equal to, or even greater than as well as smaller than, the diameter of the journals $B^2$, said proportions being as follows: If, as shown in the drawings, the diameters of the journals $B^2$ and $C^2$ are equal, then the diameter of the journals $C^3$ is to the diameter of the journals $B^3$ as the outer diameter of the ring E is to its inner diameter. If the diameters of the journals $B^3$ and $C^3$ are equal, then the diameter of the journals $B^2$ is to the diameter of the journals $C^2$ as the outer diameter of the ring E is to its inner diameter; and if neither the diameters of the journals $B^2$ and $C^2$ nor the diameters of the journals $B^3$ and $C^3$ are equal, then the outer diameter of the ring E, divided by the diameter of a journal, $B^2$, (equaling the number of its revolutions,) multiplied by the circumference of a journal, $B^3$, equals the inner diameter of the ring E divided by the diameter of a journal $C^2$, (equaling the number of its revolutions,) multiplied by the circumference of a journal, $C^3$, an equation which, if said proportions are observed, obtains whatever the ratio of the diameter of the journals $C^2$ to the diameter of the journals $B^2$. Thus in a roller-bearing to be used in any given machinery the proportions as to friction may be made to harmonize with the proportions as to strength; also, the shaft and casing being given, the diameter of the central journal can be enlarged, and thus greater space being afforded, the journals $C^3$ can be of still larger diameter without touching the shaft, and the diameter of the journals $B'$ being necessarily also proportionately smaller the diameter of the journals $C^2$ can be greatly enlarged.

Unless the weight of the rollers B is great their velocity in their orbit is also great, requiring stronger journals $B^2$ to resist their centrifugal force, the radial difference between the orbits of the two series of rollers is preferably divided into four equal parts, and one of said parts taken for the radius of a journal $B^2$, one for the radius of a journal $C^2$, and the remaining two for the thickness of the ring E, as shown in Figs. 1 and 2.

Figure 5:
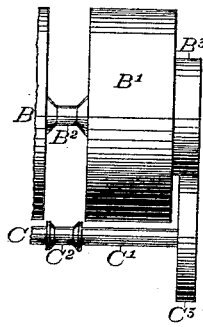
Figure 6:
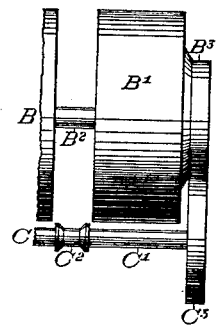

The journals $B^3$, receiving none of the pressure of the load and being required only to resist the slight pressures of the journals $C^3$, incur no substantial wear and retain substantially their original dimensions, whatever the wear of the central journal, the bearing-casing, and the journals $B'$. Therefore in this improved roller-bearing, as in said roller-bearing, application, Serial No. 268,234, the rollers B and C will be held and kept compactly and exactly in their proper relative positions by parts exempt from all substantial wear and rotating without sliding friction, despite all changes in the dimensions of the parts liable to substantial wear. In this improved roller-bearing also the rollers B may be placed nearer to each other and made of a greater diameter in proportion to the diameter of the central journal than in said roller-bearing, thus reducing the rolling friction. The journals $B^3$, being required only to resist the pressures of the journals $C^3$, need not be longer than the bearing portions of the latter journals, and the length of either need be and preferably is only a small fraction of that of the journals $B'$. Preferably if the rollers C are retained longitudinally by the outer ends of the journals $B'$, said outer ends are beveled, as shown in Figs. 2, 3, 4, and 6, and if the rollers C are retained longitudinally by the ring E the journals $B^3$ are a little longer than the bearing portions of the journals $C^3$, as shown in Fig. 5, sliding friction between the journals $C^3$ and the outer ends of the journals $B'$ being thus avoided. Preferably the rollers C are retained by the ring E, the journals $C^2$ being provided with collars at their ends for that purpose, (as well as for the retention of the ring F,) and said collars and the inner ends of the journals $B'$ beveled, as shown in Fig. 5, to avoid sliding friction between said ends and the ends of the rings.

In addition to all the improvements resulting from the employment of said sleeves, as in said roller-bearing, my invention is necessarily an improvement in the respects hereinbefore set forth; also on my roller-bearing shown and described in my application for patent filed April 16, 1887, Serial No. 235,040, in which the ring E is the only ring employed; on my roller-bearing shown and described in my application for patent filed February 18, 1888, Serial No. 264,520, in which the rings E and F are the only rings employed; on my roller-bearing shown and described in my application for patent filed February 27, 1888, Serial No. 265,434, in which the rings E and G are the only rings employed, and on my roller-bearing shown and described in my application for patent filed March 3, 1888, Serial No. 266,084, in which the rings E, F, and G are employed.

All the journals $B'$ and $C^3$ may be formed separate from and securely and rigidly attached to the journals $B^2$ and $C^2$, or all or any of them (except, of course, those necessarily removable to permit the insertion between the shaft and casing of the rollers and rings in their proper relative position) may be formed integral with the journals $B^2$ and $C^2$, respectively.

Figure 8:
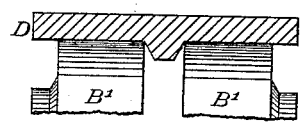
Figure 9:
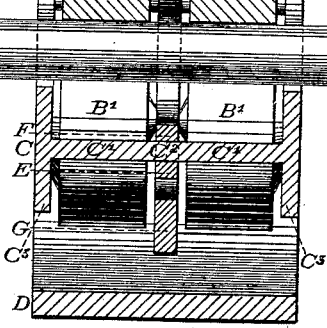

The number of journals $B'$ and $C^3$ necessarily removable will depend upon the rings employed, the means used to keep the rollers B in their longitudinal positions upon the shaft and within the casing, and the spaces between the inner ends of these journals. If the ring E only is employed and one of the flanges of the casing is removable, as shown in Fig. 8, the rollers and ring may be placed in their relative positions without the removal of any journal $B'$ or $C^3$. In no case is it necessary to remove both journals $B'$ or both journals $C^3$ from any journal $B^2$ or $C^2$. Whenever removable, they are preferably attached by slipping them as sleeves tightly over extensions of the journals $B^2$ and $C^2$. The journals $B^3$ also may be formed either separate from and fastened to or integral with the journals $B'$.

It is evident that the journals $B^3$ may be located at the inner instead of the outer ends of the journals $B'$; also, that the journals $B^3$ may be located one between the inner and outer ends of each journal $B'$; also, that if two sets of rings are employed—a set at each of the outer ends of the rollers—each roller B may have but one journal $B^3$, and each roller C but one journal $C^3$. Therefore I do not intend to limit my claims to any particular number of journals $B^3$ and $C^3$, nor to any particular longitudinal location of said journals relatively to the rollers.

I claim as my invention—

1. In a roller-bearing, the combination of a series of bearing-rollers bearing directly on the central journal and the bearing-casing, a series of separating-rollers to keep the bearing-rollers separate from each other, bearing neither on the shaft nor casing, but on the bearing-rollers, and a ring-bearing at its periphery on journals of the bearing-rollers, and at its inner side on journals of the separating-rollers, the bearing-rollers having journals of smaller diameter than the bearing-rollers and adapted to bear only on journals of the separating-rollers, and the latter journals being adapted to bear only on the last-mentioned journals of the bearing-rollers, all substantially as and for the purposes set forth.

2. In a roller-bearing, the combination, with a ring, E, of a series of rollers, B, consisting of journals $B'$, bearing directly on the shaft A, and the casing D, of journals $B^2$, rotating in contact with the periphery of the ring E, and of journals $B^3$, of smaller diameter than the journals $B'$, and a series of rollers, C, consisting of journals $C^3$, adapted to bear only on the journals $B^3$, adapted to bear only on the journals $C^3$, and of journals $C^2$, rotating in contact with the inner side of the ring E, all substantially as shown and described, and for the purposes set forth.

3. A roller-bearing comprising the central journal, the bearing-casing, a ring, E, coaxial with the central journal, a series of bearing-rollers bearing directly on the central journal and the bearing-casing and having journals rotating in contact with the periphery of the ring E, and journals smaller than the bearing-rollers and bearing only on a series of separating-rollers keeping the bearing-rollers separate from each other, and said series of separating-rollers bearing on said smaller journals, but on no other parts of the bearing-rollers, nor on the shaft nor casing, and having journals rotating in contact with the inner side of the ring E, all constructed, arranged, combined, and adapted to operate substantially as and for the purposes set forth.

4. A roller-bearing comprising the shaft A, the casing D, the ring E, the series of rollers B, consisting each of two journals, $B'$, bearing directly on the shaft A and casing D, of a journal, $B^2$, located between the journals $B'$ and rotating in contact with the periphery of the ring E, and of two journals, $B^3$, of smaller diameter than the journals $B'$ and located one at the outer end of each journal $B'$ and bearing only on the journals $C^3$, each journal $B^3$ on and between two journals $C^3$, and the series of rollers C, consisting each of two journals $C^3$, bearing only on the journals $B^3$, each journal $C^3$ on and between two journals $B^3$, and of a journal, $C^2$, located between the journals $C^3$ and rotating in contact with the inner side of the ring E, all constructed, arranged, combined, and adapted to operate substantially as shown and described, and for the purposes set forth.

5. In a roller-bearing, the combination of a series of bearing-rollers bearing directly on the central journal and the bearing-casing, a series of separating-rollers to keep the bearing-rollers separate from each other, bearing neither on the shaft nor casing, but on the bearing-rollers, a ring bearing at its periphery on journals of the bearing-rollers, and at its inner side on journals of the separating-rollers, and a ring bearing at its periphery on journals of the separating-rollers, the bearing-rollers having journals of smaller diameter than the bearing-rollers and adapted to bear only on journals of the separating-rollers, and the latter journals being adapted to bear only on the last-mentioned journals of the bearing-rollers, all substantially as and for the purposes set forth.

6. In a roller-bearing, the combination, with rings E and F, of a series of rollers, B, consisting of journals $B'$, bearing directly on the shaft A and the casing D, of journals $B^2$ tating in contact with the periphery of the ring E, and of journals B³, of smaller diameter than the journals B', and a series of rollers, C, consisting of journals C³, adapted to bear only on the journals B³, adapted to bear only on the journals C³, and of journals C², rotating in contact with the inner side of the ring E and the periphery of the ring F, all substantially as shown and described, and for the purposes set forth.

7. A roller-bearing comprising the central journal, the bearing-casing, two rings, E and F, coaxial with the central journal and of different diameters, a series of bearing-rollers bearing directly on the central journal and the bearing-casing, and having journals rotating in contact with the periphery of the larger ring, E, and journals smaller than the bearing-rollers and bearing only on a series of separating-rollers, keeping the bearing-rollers separate from each other, and said series of separating-rollers bearing on said smaller journals, but on no other parts of the bearing-rollers, nor on the shaft nor casing, and having journals rotating in contact with the inner side of said larger ring, E, and in contact with the periphery of the smaller ring, F, all constructed, arranged, combined, and adapted to operate substantially as and for the purposes set forth.

8. A roller-bearing comprising the shaft A, the casing D, the rings E and F, the series of rollers B, consisting each of two journals, B', bearing directly on the shaft A and casing D, of a journal, B², located between the journals B' and rotating in contact with the periphery of the ring E, and of two journals, B³, of smaller diameter than the journals B' and located one at the outer end of each journal B' and bearing only on the journals C³, each journal B³ on and between two journals C³, and the series of rollers C, consisting each of two journals C³, bearing only on the journals B³, each journal C³ on and between two journals B³, and of a journal, C², located between the journals C³ and rotating in contact with the inner side of the ring E and the periphery of the ring F, all constructed, arranged, combined, and adapted to operate substantially as shown and described, and for the purposes set forth.

9. In a roller-bearing, the combination of a series of bearing-rollers bearing directly on the central journal and the bearing-casing, a series of separating-rollers to keep the bearing-rollers separate from each other, bearing neither on the shaft nor casing, but on the bearing-rollers, a ring bearing at its periphery on journals of the bearing-rollers, and at its inner side on journals of the separating-rollers, and a ring bearing at its inner side on journals of the bearing-rollers, the bearing-rollers having journals of smaller diameter than the bearing-rollers and adapted to bear only on journals of the separating-rollers, and latter journals being adapted to bear only last-mentioned journals of the bearing-rollers, all substantially as and for the purposes set forth.

10. In a roller-bearing, the combination, with rings E and G, of a series of rollers, B, consisting of journals B', bearing directly on the shaft A and the casing D, of journals B², rotating in contact with the periphery of the ring E, and the inner side of the ring G and of journals B³, of smaller diameter than the journals B', and a series of rollers, C, consisting of journals C³, adapted to bear only on the journals B³, adapted to bear only on the journals C³, and of journals C², rotating in contact with the inner side of the ring E, all substantially as shown and described, and for the purposes set forth.

11. A roller-bearing comprising the central journal, the bearing-casing, two rings, E and G, coaxial with the central journal and of different diameters, a series of bearing-rollers bearing directly on the central journal and the bearing-casing, and having journals rotating in contact with the periphery of the smaller ring, E, and in contact with the inner side of the larger ring, G, and journals smaller than the bearing-rollers, and bearing only on a series of separating-rollers keeping the bearing-rollers separate from each other, and said series of separating-rollers bearing on said smaller journals, but on no other parts of the bearing-rollers, nor on the shaft nor casing, and having journals rotating in contact with the inner side of said smaller ring, E, all constructed, arranged, combined, and adapted to operate substantially as and for the purposes set forth.

12. A roller-bearing comprising the shaft A, the casing D, the rings E and G, the series of rollers B, consisting each of two journals, B', bearing directly on the shaft A and casing D, of a journal, B², located between the journals B' and rotating in contact with the periphery of the ring E and the inner side of the ring G, and of two journals, B³, of smaller diameter than the journals B', and located one at the outer end of each journal B', and bearing only on the journals C³, each journal B³ on and between two journals C³, and the series of rollers C, consisting each of two journals C³, bearing only on the journals B³, each journal C³ on and between two journals B³, and of a journal, C², located between the journals C³ and rotating in contact with the inner side of the ring E, all constructed, arranged, combined, and adapted to operate substantially as shown and described, and for the purposes set forth.

13. In a roller-bearing, the combination of a series of bearing-rollers bearing directly on the central journal and the bearing-casing, a series of separating-rollers to keep the bearing-rollers separate from each other, bearing neither on the shaft nor casing, but on the bearing-rollers, a ring bearing at its periphery on journals of the bearing-rollers and at its inner side on journals of the separating-rollers, a ring bearing at its periphery on journals of the separating-rollers, and a ring bearing at its inner side on journals of the bearing-rollers, the bearing-rollers having journals of smaller diameter than the bearing-rollers and adapted to bear only on journals of the separating-rollers, and the latter journals being adapted to bear only on the last-mentioned journals of the bearing-rollers, all substantially as and for the purposes set forth.

14. In a roller-bearing, the combination, with rings E, F, and G, of a series of rollers, B, consisting of journals $B'$, bearing directly on the shaft A and the casing D, of journals $B^2$, rotating in contact with the periphery of the ring E and the inner side of the ring G, and of journals $B^3$, of smaller diameter than the journals $B'$, and a series of rollers, C, consisting of journals $C^3$, adapted to bear only on the journals $B^3$, adapted to bear only on the journals $C^3$, and of journals $C^2$, rotating in contact with the inner side of the ring E and the periphery of the ring F, all substantially as shown and described, and for the purposes set forth.

15. A roller-bearing comprising the central journal, the bearing-casing, three rings coaxial with the central journal and of different diameters, a series of bearing-rollers bearing directly on the central journal and the bearing-casing, and having journals rotating in contact with the periphery of the intermediate ring and with the inner side of the larger ring, and journals smaller than the bearing-rollers and bearing only on a series of separating-rollers keeping the bearing-rollers separate from each other, and said series of separating-rollers bearing on said smaller journals, but on no other parts of the bearing-rollers, nor on the shaft nor casing, and having journals rotating in contact with the inner side of said intermediate ring and with the periphery of the smaller ring, all constructed, arranged, combined, and adapted to operate substantially as and for the purposes set forth.

16. A roller-bearing comprising the shaft A, the casing D, the rings E, F, and G, the series of rollers B, consisting each of two journals, $D'$, bearing directly on the shaft A and casing D, of a journal, $B^2$, located between the journals $B'$ and rotating in contact with the periphery of the ring E and the inner side of the ring G, and of two journals, $B^3$, of smaller diameter than the journals $B'$ and located one at the outer end of each journal $B'$ and bearing only on the journals $C^3$, each journal $B^3$ on and between two journals $C^3$, and the series of rollers C, consisting each of two journals $C^3$, bearing only on the journals $B^3$, each journal $C^3$ on and between two journals $B^3$, and of a journal, $C^2$, located between the journals $C^3$ and rotating in contact with the inner side of the ring E and the periphery of the ring F, all constructed, arranged, combined, and adapted to operate substantially as shown and described, and for the purposes set forth.

REUBEN W. HENT.

Witnesses:
JAMES C. CARY,
JOHN C. WINANS.